US008024325B2

(12) United States Patent
Zhang et al.

(10) Patent No.: US 8,024,325 B2
(45) Date of Patent: Sep. 20, 2011

(54) ESTIMATING THE COST OF XML OPERATORS FOR BINARY XML STORAGE

(75) Inventors: Ning Zhang, Palo Alto, CA (US); Sam Idicula, Mountain View, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 435 days.

(21) Appl. No.: 12/145,659

(22) Filed: Jun. 25, 2008

(65) Prior Publication Data

US 2009/0327252 A1    Dec. 31, 2009

(51) Int. Cl.
G06F 7/00  (2006.01)
G06F 17/30 (2006.01)

(52) U.S. Cl. ........................... 707/718; 707/719
(58) Field of Classification Search .................. 707/718, 707/719
See application file for complete search history.

(56) References Cited

U.S. PATENT DOCUMENTS

| | | | | |
|---|---|---|---|---|
| 4,769,772 | A * | 9/1988 | Dwyer | 707/714 |
| 5,999,936 | A | 12/1999 | Pattison et al. | |
| 7,139,746 | B2 | 11/2006 | Shin et al. | |
| 7,596,548 | B2 * | 9/2009 | Josifovski et al. | 1/1 |
| 7,707,005 | B2 * | 4/2010 | Fraser et al. | 702/180 |
| 2003/0140308 | A1 | 7/2003 | Murthy et al. | |
| 2004/0128296 | A1 | 7/2004 | Krishnamurthy et al. | |
| 2004/0163041 | A1 | 8/2004 | Engel | |
| 2004/0172599 | A1 | 9/2004 | Calahan | |
| 2004/0205082 | A1 * | 10/2004 | Fontoura et al. | 707/101 |
| 2004/0221229 | A1 | 11/2004 | Perry | |
| 2004/0261019 | A1 | 12/2004 | Imamura et al. | |
| 2005/0091188 | A1 | 4/2005 | Pal et al. | |
| 2005/0203957 | A1 | 9/2005 | Wang et al. | |
| 2006/0005122 | A1 | 1/2006 | Lemoine | |
| 2006/0036631 | A1 | 2/2006 | Cheslow | |
| 2006/0212467 | A1 * | 9/2006 | Murthy et al. | 707/101 |
| 2007/0043696 | A1 | 2/2007 | Haas et al. | |
| 2007/0043702 | A1 | 2/2007 | Lakshminarayanan et al. | |
| 2007/0112851 | A1 | 5/2007 | Tomic et al. | |
| 2008/0091623 | A1 | 4/2008 | Idicula et al. | |

(Continued)

OTHER PUBLICATIONS

Zhang et al., Statistical Learning Techniques for Costing XML Queries, 2005, Proceedings of the 31st VLDB conference, pp. 289-300.*

(Continued)

*Primary Examiner* — Yicun Wu
*Assistant Examiner* — Pavan Mamillapalli
(74) *Attorney, Agent, or Firm* — Hickman Palermo Truong & Becker LLP

(57) ABSTRACT

Techniques for estimating the cost of processing a database statement that includes one or more path expressions are provided. One aspect of cost is I/O cost, or the cost of reading data from persistent storage into memory according to a particular streaming operator. Binary-encoded XML data is stored in association with a synopsis that summarizes the binary-encoded XML data. The synopsis includes skip length information for one or more elements and indicates, for each such element, how large (e.g., in bytes) the element is in storage. The skip length information of a particular element thus indicates how much data may be skipped during I/O if the particular element does not match the path expression that is input to the streaming operator. The skip length information of one or more elements is used to estimate the cost of processing the database statement.

20 Claims, 6 Drawing Sheets

U.S. PATENT DOCUMENTS

2008/0222087 A1  9/2008  Balmin et al.

OTHER PUBLICATIONS

Beyer et al., 'System RX: One Part Relational, One Part XML', Jun. 14-16, 2005, SIGMOD, pp. 347-358.*

Balmin et al., 'Cost-based Optimization in DB2 XML', 2006, IBM System Jornal, IBM, vol. 45 No. 2, pp. 299-319.*

Josifovski et al., 'Querying XML Streams', Apr. 8, 2004, VLDB Journal, pp. 1-14.*

Goldman, Roy, et al., "DataGuides: Enabling Query Formulation and Optimization in Semistructured Databases", The International Conference on Very Large Data Bases, 1997, 21 pages.

Zhang, N. et al., "Statistical Learning Techniques for Costing XML Queries" downloaded Apr. 2008 (pp. 289-300).

L. Fegaras, D. Levine, S. Bose, and V. Chaluvadi, "Query Processing of Streamed XML Data," 11$^{th}$ Int'l Conf. Information and Knowledge Management, Nov. 2002, 8 pages.

Bayardo, R. et al., "An Evaluation of Binary Encoding Optimizations for Fast Stream Based XML Processing," Proceedings of the 13$^{th}$ International World Wide Web Conference, New York, NY, May 2004, 10 pages.

Fegaras, L. et al., "Query Processing of Streamed XML Data," Proc. 11$^{th}$ Int'l Conf. Information and Knowledge Management, Nov. 2002, 8 pages.

* cited by examiner

ESTIMATING THE COST OF XML OPERATORS FOR BINARY XML STORAGE

CROSS-REFERENCE TO RELATED APPLICATIONS

This application is related to U.S. patent application Ser. No. 11/950,642 filed on Dec. 5, 2007 by Sam Idicula et al., entitled "Efficient Streaming Evaluation Of Xpaths On Binary-Encoded XML Schema-Based Documents", the contents of which are incorporated by reference as if fully disclosed herein.

FIELD OF THE INVENTION

The present invention relates to database systems, and in particular, to estimating a cost of executing a query executed by a database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

XML

Database systems often store XML-formatted data within their databases. This data may come from a variety of sources, though the source is often an XML document or a database object.

In XML, data items known as elements are delimited by an opening tag and a closing tag. An element may also comprise attributes, which are specified in the opening tag of the element. Text between the tags of an element may represent any sort of data value, such as a string, date, or integer.

Text within an element may alternatively represent one or more elements. Elements represented within the text of another element are known as subelements or child elements. Elements that store subelements are known as parent elements. Since subelements are themselves elements, subelements may, in turn, be parent elements of their own subelements. Parent elements and elements with attributes are considered "complex elements" whereas elements that have neither children elements nor attributes are considered "simple elements." Attributes, like elements, are considered nodes. Attributes are also considered to be "simple" because they never have child elements or attributes.

The resulting hierarchical structure of XML-formatted data is often discussed in terms akin to those used to discuss a family tree. For example, a subelement is said to descend from its parent element or any element from which its parent descended. A parent element is said to be an ancestor element of any subelement of itself or of one of its descendant element. Collectively, an element along with its attributes and descendants, are often referred to as a tree or a subtree.

XML Schema

XML Schema is a definition language that provides facilities for describing structure and constraining the contents of an XML document. A draft specification, referred to hereinafter as "XML Schema Specification", for the XML Schema definition language is described in a set of three documents published by the W3C Consortium. The first document in the set is "XML Schema Part 0: Primer Second Edition", W3C Recommendation Oct. 28, 2004, located at "http://www.w3.org/TR/xmlschema-0/", the entire contents of which are hereby incorporated by reference for all purposes as if fully set forth herein. The second document in the set is "XML Schema Part 1: Structures Second Edition", W3C Recommendation Oct. 28, 2004, located at "http://www.w3.org/TR/xmlschema-1/", the entire contents of which are hereby incorporated by reference for all purposes as if fully set forth herein. The third document in the set is "XML Schema Part 2: Datatypes Second Edition", W3C Recommendation Oct. 28, 2004, located at "http://www.w3.org/TR/xmlschema-2/", the entire contents of which are hereby incorporated by reference for all purposes as if fully set forth herein.

As referred to herein, an XML schema is a defined structure for one or more XML documents. An XML schema representation is data that describes the XML structure. An XML schema representation may include an XML document with declarations and/or a tokenized XML representation which is one for which tokens have been generated. An example of an XML schema representation includes, but is not limited to, an XML document with type definitions, element declarations, or attribute declarations.

Binary-Encoded XML

Binary-encoded XML is one format in which XML data may be stored in a database. Binary-encoded XML is taught, for example, in "TECHNIQUES FOR EFFICIENT LOADING OF BINARY XML DATA," incorporated above. and also in U.S. patent application Ser. No. 11/182,997, filed Jul. 14, 2005, entitled "ENCODING OF HIERARCHICALLY ORGANIZED DATA FOR EFFICIENT STORAGE AND PROCESSING," by Murthy et al, the entire contents of which are hereby incorporated by reference for all purposes as if fully set forth herein. Embodiments of the invention are not limited to any particular method for encoding XML data into a binary format.

Binary-encoded XML is a compact binary representation of XML that was designed to reduce the size of XML documents. One of the ways binary-encoded XML compresses data is by representing strings ("tokens") with fixed values.

In one implementation of binary-encoded xml, a mapping is established between character strings and replacement values, where the character strings are tag names, and the replacement values are numbers. Such mappings are referred to herein as "translation information".

For example, consider an XML document PO1 that contains the following content:

```
<PurchaseOrder>
    <item>
        Important Data
    </item>
</PurchaseOrder>
```

PO1 includes the tokens PurchaseOrder and item. To store PO1 in binary-encoded XML format, the token 'PurchaseOrder' may be mapped to 1, and the token 'item' may be mapped to 2. Typically, the replacement values consume much less space than the corresponding tokens. For example, the token 'PurchaseOrder', which contains fourteen characters, may be assigned a binary replacement value that takes less space to store than a single text character.

Once translation information has been created, XML documents may be stored in binary-encoded XML based on the translation information. For example, PO1 may be stored as <1><2>Important Data</2></1>. In typical implementations of binary-encoded xml, even the symbols (e.g. "<", ">", and "/") may be represented by binary replacement values.

Translating Between Binary-Encoded XML and Text

When stored in binary-encoded XML, an XML document consumes much less space than is required by other formats of XML storage. However, the space savings is achieved at the cost of additional overhead required to convert textual XML to binary-encoded XML, and to convert binary-encoded XML to textual XML. For example, to be meaningful to an application that requests PO1, '<1><2>Important Data</2></1>' would have to be translated back into:

```
<PurchaseOrder>
    <item>
        Important Data
    </item>
</PurchaseOrder>
```

In order to reconstruct the text of an XML document that has been stored in binary format, the translation information that was used to encode the XML document must be available. The translation information that is used to store XML data within a database are typically stored separate from the binary-encoded XML data itself.

Translation Information

How database system stores translation information may hinge on whether the translation information is for known-schema XML or for unknown-schema XML. XML data is "known-schema" XML if the database server knows the XML schema to which the XML data conforms. The database server may "know" the schema, for example, if the schema has been registered with the database server.

On the other hand, XML data is "unknown-schema" XML if the database server does not know the schema to which the XML data conforms. Thus, unknown-schema XML includes both (a) XML documents that do not conform to any schema and (b) XML documents that conform to an XML schema, but the XML schema is not known to the database server.

In some database systems, the translation information for known-schema binary-encoded XML is stored on a per-schema basis. Thus, since all documents that conform to a given schema will typically contain the same tag strings, the same translation information is used to encode all of the documents that conform to the given schema.

In some database systems, the translation information for known-schema binary-encoded XML is stored in a database as part of the definition of the schema. Schema definitions, in turn, are stored in a schema table.

In some database systems, translation information may not be required for known-schema binary-encoded XML. In such database systems, the algorithm for translating between binary-encoded XML and non-binary-encoded XML is well known, so that any component with access to an XML schema may determine a translation based solely on the XML schema.

For example, the following XML schema, hereinafter known as POSchema1 may have been used to encode PO1 above:

```
<?xml version="1.0" encoding="utf-8"?>
<xs:schema xmlns:xs="http://www.w3.org/2001/XMLSchema">
    <xs:element name="PurchaseOrder">
        <xs:complexType>
            <xs:sequence>
                <xs:element name="item" type="xs:int"
                    maxOccurs="2" />
            </xs:sequence>
        </xs:complexType>
    </xs:element>
</xs:schema>
```

Because 'PurchaseOrder' is the first element listed in the schema, it may have been encoded as the number 1. Likewise, since 'item' is the second element in the schema, it may have been encoded as the number 2. Other elements may be encoded using this same algorithm. An XML decoder may decode any document that follows this schema just by examining POSchema1 and being aware of this encoding algorithm.

In some database systems, the translation information for all unknown-schema binary-encoded XML is stored in tables referred to herein as "token tables". In one embodiment, three token tables are used to store the translation information for unknown-schema XML: a Qname token table, a namespace token table, and a path_id token table. The three token tables are collectively referred to as a "token table set".

The Qname token table for an XML schema contains the Qname-to-replacement-value mappings used to encode the Qnames contained in unknown-schema XML. The namespace token table for an XML schema contains the namespace-to-replacement-value mappings used to encode the namespaces contained in unknown-schema XML. The path_id token table for an XML schema contains the path_id-to-replacement-value mappings used to encode the path_ids contained in unknown-schema XML.

XML Query and XPath

It is important for object-relational database systems that store XML data to be able to execute queries using XML query languages. XML Query Language (XQuery) and XML Path Language (XPath) are important standards for a query language, which can be used in conjunction with SQL to express a large variety of useful queries. XPath is described in *XML Path Language (XPath)*, version 1.0 (W3C Recommendation Nov. 16, 1999), herein incorporated by reference and available at the time of writing at http://www.w3.org/TR/xpath, as well as in *XML Path Language (XPath)* 2.0 (W3C Recommendation 23 Jan. 2007), herein incorporated by reference and available at the time of writing at http://www.w3.org/TR/xpath. XQuery is described in *XQuery 1.0: An XML Query Language* (W3C Recommendation 23 Jan. 2007), herein incorporated by reference and available at the time of writing at http://www.w3.org/TR/xquery.

XPath Evaluation with Binary-Encoded XML

Some techniques for evaluating XML queries rely on normalizing an XML query to form a set of simple XPath expressions. The XPath expressions may then be evaluated in numerous ways, such as against an XML index ("XML index-based evaluation") or against a streamed XML data source ("streaming evaluation"). Although the specific type of index relied on is not important for this invention, XML index-based evaluation may rely on the XML index discussed in U.S. patent application Ser. No. 10/884,311, filed Jul. 2, 2004, entitled "Index For Accessing XML Data," by Sivasankaran Chandrasekar et al., which is hereby incorporated by reference for all purposes as if fully disclosed herein.

Streaming evaluation techniques typically rely on an XPath evaluator built in to the database system where the XML data is stored. One streaming evaluation technique is discussed in U.S. patent application Ser. No. 11/716,505, filed Mar. 8, 2007, entitled "Technique To Estimate The Cost Of Streaming Evaluation Of XPaths," by Idicula et al., which is hereby incorporated by reference for all purposes as if fully disclosed herein.

In one implementation, a streaming evaluation of an XML query requires one or more XPath path expressions and builds a non-deterministic finite automaton (NFA). An NFA comprises a set of states, some of which are marked as "accepting states". The NFA receives input from an underlying (e.g., binary) XML storage stream and makes state transitions according to the input. When one of the "accepting states" is reached, the input is passed as an output to an upstream operator. The following is an example query that, when executed, extracts the author's name of the book "Lord of the Rings" from a bibliography table ('bib').

```
SELECT Extract(S.Author, '/author/name')
FROM bibliography bib,
    XMLTABLE('/bib/book' passing bib.object_value
        COLUMNS Author XMLTYPE PATH '/book/author',
            Title VARCHAR2(40) PATH '/book/title') S
WHERE S.Title = "Lord of the Rings";
```

Query Example 1

Query Example 1 comprises two XML operators: EXTRACT and XMLTABLE. Each of these operators may be evaluated in a streaming fashion. According to one technique, the implementation of the XMLTABLE operator constructs two NFAs: one for the driving path expression '/bib/book' and another for the two "column" path expressions '/book/author' and '/book/title'. The results of the XMLTABLE operator are stored in a table 'S' that comprises two columns: an Author column of XMLtype and a Title column of type variable character. Each row in table 'S' corresponds to a different '/bib/book' element discovered in table 'bib'.

The EXTRACT operator takes the input from the Author column of table 'S' and builds an NFA corresponding to '/author/name'. In general, all streaming operators build NFAs. Thus, two major factors in determining the cost of a streaming operator include the CPU cost of the NFA and the I/O cost of reading the input stream.

Some ways for evaluating a particular XML query (e.g., streaming evaluation and index-based evaluation) may be more efficient than other ways depending on the type of data and the specific query. For each evaluation technique, a query optimizer might generate one or more execution plans. In order to select the least "expensive" execution plan, it is important for the query optimizer to accurately estimate (i.e., before execution) the cost of each execution plan.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
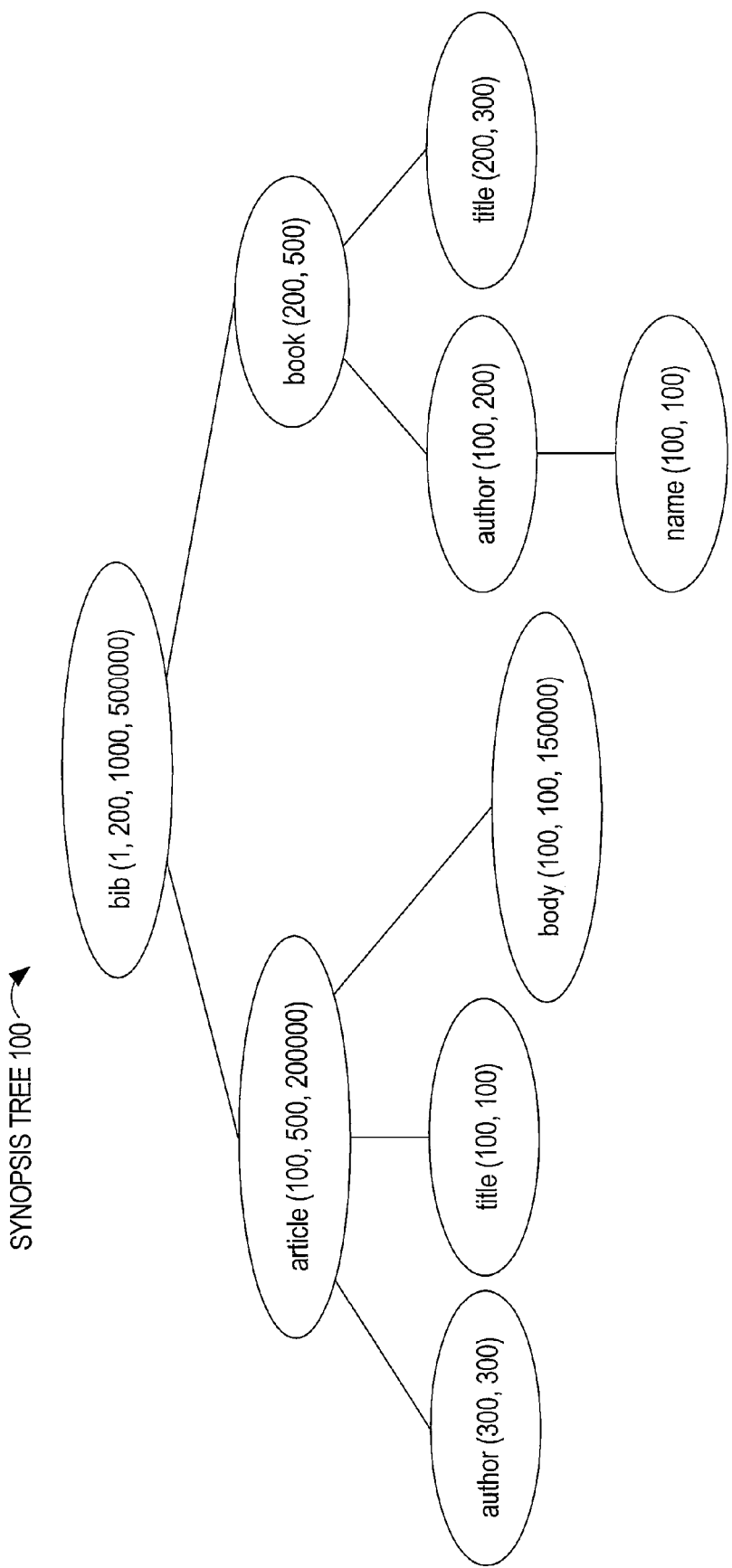
FIG. 1 is a diagram that depicts a synopsis tree that corresponds to an example synopsis document, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for estimating the cost of executing an XML query with XML streaming operators. One aspect of query cost is the I/O cost of reading input data in a streaming fashion. In order to support streaming evaluation of an XPath expression based on a NFA, XML data may be read using one of two types of decoders: an event-based decoder and a search-based decoder. In an event-based decoder, for each input opcode read from binary storage, an event is generated. The NFA accepts the event and attempts to match the path expression. The estimated cost of reading an entire binary large object (BLOB) that stores the target XML data may simply be modeled as $c*L$, where L is the length of the BLOB and c is some adjusting constant.

However, in a search-based decoder, estimating the I/O cost of reading input data is more complex. A search-based decoder may "skip" (i.e., not read) certain elements or subtrees if those elements do not match the pertinent XPath expression. Therefore, in such cases, the I/O cost may be lower than the cost of reading the entire BLOB. In order to accurately model the I/O cost, the length of data that may be skipped through decoding should be ascertained. In an embodiment, knowing the length of skipped data is achieved by annotating a synopsis (i.e., statistics), associated with the XML data, with the total skipping length of a particular path. When estimating the cost of executing a particular candidate execution plan associated with a streaming evaluation, the synopsis associated with the target XML data is analyzed to determine how much data may be skipped.

Another aspect of query cost is the CPU cost of executing one or more NFAs associated with a streaming evaluation of one or more path expressions. The CPU cost of an NFA is determined by multiple factors, or features. Each feature requires the NFA to do some work that requires CPU cycles.

In order to estimate a CPU cost of executing a particular path expression using a streaming operator, a CPU cost estimate function (or simply "CPU cost function") must have been generated for that streaming operator. The CPU cost function may be generated by identifying the pertinent features, determining a complexity function (e.g., $n*\log n$, $n^2$) for each feature, executing multiple test queries to generate actual costs associated with each feature, and running a regression tool against the actual costs to generate coefficients for each feature. The features, complexity functions, and coefficients are used to generate a CPU cost function for the streaming operator.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimizer and Execution Plans

Generally, a query parser receives a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by a query optimizer.

The term query is used herein to refer to any form of representing a query, including a query in the form of a database statement or in the form of an internal query representation. A query optimizer may receive a query from another entity other than query parser, where the query received is in the form of an internal query representation.

A query optimizer generates one or more different candidate execution plans for a query. The query optimizer evaluates the one or more candidate execution plans to determine which should be used to compute the query.

Execution plans may be represented by a graph of interlinked nodes, referred to herein as operators, that each corresponds to a step of an execution plan, referred to herein as an execution plan operation. The hierarchy of the graphs (i.e., directed tree) represents the order in which the execution plan operations are performed and how data flows between each of the execution plan operations. Execution plan operations include, for example, a table scan, an index scan, hash-join, sort-merge join, nested-loop join, and filter.

A query optimizer may optimize a query by transforming the query. In general, transforming a query involves rewriting a query into another query that produces the same result and that can potentially be executed more efficiently, i.e. one for which a potentially more efficient and less costly execution plan can be generated. Examples of query transformation include view merging, subquery unnesting, filter predicate move-around and pushdown, common sub-expression elimination, outer-to-inner join conversion, materialized view rewrite, star transformation, and join predicate push down. A query is rewritten by manipulating a deep copy of the query representation to form a transformed query representation representing a transformed query. The query as transformed is referred to herein as the transformed query; the query whose copy is transformed is referred to as the base query.

A query optimizer may also perform more than one transformation for evaluation. Each transformed query generated for a query is referred to as a candidate transformed query or candidate query. A transformed query rewritten to generate another transformed query is referred to herein as a base query for the other transformed query. The query originally received by a query optimizer is referred to as the original query.

Cost Estimation

To evaluate the candidate execution plans in the search space, a query optimizer may estimate a cost of each candidate execution plan and compares the estimated query costs to select an execution plan for execution. In an embodiment, the estimated query cost is generated by a query cost estimator, which may be a component of a query optimizer. For a plan supplied by a query optimizer, a cost estimator computes and generates an estimated query cost. In general, the estimated query cost represents an estimate of computer resources expended to execute an execution plan. The estimated cost may be represented as the execution time required to execute an execution plan. To determine which candidate execution plan in the search space to execute, a query optimizer may select the candidate execution plan with the lowest estimated cost.

Synopsis

As mentioned previously, one or more subtrees in XML data may be skipped, thus avoiding the I/O cost of reading in those subtrees. The knowledge of which subtrees may be skipped during query execution may be exploited to more accurately estimate the cost of executing an XML query. Relatively accurate estimation of "skippable subtrees" requires statistics on those subtrees. According to an embodiment of the invention, a collection of one or more XML documents is summarized into a synopsis that captures all rooted paths in the one or more XML documents. This is possible due to the hierarchical nature of the XML data model. Statistics for each node in the synopsis may be stored. The following is an example synopsis of one or more XML documents:

```
<bib count="1" child_cnt="200" desc_cnt="1000" skip_len="500000">
    <article count="100" desc_cnt="500" skip_len="200000">
        <author count="300" desc_cnt="300"/>
        <title count="100" desc_cnt="100"/>
        <body count="100" desc_cnt="100" skip_len="150000"/>
    </article>
    <book count="200" desc_cnt="500">
        <author count="100" desc_cnt="200">
            <name count="100" desc_cnt="100"/>
        </author>
        <title count="200" desc_cnt="300"/>
    </book>
</bib>
```

Synopsis Example 1

FIG. 1 is a diagram that depicts a synopsis tree 100 that corresponds to Synopsis Example 1. Synopsis tree 100 is described in more detail below.

Synopsis Example 1 preserves some information from the one or more XML document that it summaries. First, in a synopsis, such as Synopsis Example 1, most (if not all) rooted paths of a document are preserved.

Second, the number of elements that can be reached by each path in a document may be captured in a synopsis, e.g., using the attribute "count". For example, Synopsis Example 1 indicates that there are three hundred (300) elements under path /bib/article/author and two hundred (200) elements under path /bib/book/title.

Third, the number of children and descendants of an element in a document may be captured in a synopsis, e.g., using the "child_cnt" and "descendants_cnt" attributes, respectively. According to Synopsis Example 1, element 'bib' has two hundred (200) children and one thousand (1000) descendants. As indicated in Synopsis Example 1, some (or all) elements may not be associated with all of the various statistics, or element attributes, discussed herein. For example, element 'bib' is the only element in Synopsis Example 1 that contains a child_cnt attribute.

Fourth, the cardinality of parent-child relationships in a document may be accurately captured in a synopsis, e.g., using an attribute "parent_cnt" (not shown).

Fifth, the number of text nodes in a document may be captured in a synopsis, e.g., using the "text_cnt" attribute (not shown).

Sixth, the total skip length associated with each element in a document may be captured in a synopsis, e.g., using a "skip_len" attribute. This attribute indicates that if all the corresponding elements were skipped during a streaming evaluation, then the corresponding attribute value is the number of bytes that do not have to be read, e.g., from persistent storage. In other words, the skip_len attribute indicates an amount of data in the persistent storage that all the corresponding elements require for storage. For example, if '/bib/article' is not a valid state in an NFA, then 200,000 bytes, associated with subtrees rooted at '/bib/article', are not required to be read from storage.

The value of the skip_len attribute may be determined while the corresponding XML document is encoded in a binary format. In that case, the XML encoder keeps track of how many bytes each element (or each "large" element) is in length and causes the total length of each element to be recorded in the corresponding synopsis. For example, the length of each 'article' element is maintained while a bibliography XML document is binary-encoded. The sum of all the lengths is computed after all the 'article' elements are binary-encoded. U.S. patent application Ser. No. 11/950,642, which is incorporated by reference above, describes in further detail how skip information is created and stored with a binary-encoded XML document and how the skip information is used during an I/O operation.

Thus, each node in synopsis tree 100 corresponds to a different element in Synopsis Example 1. Also, each node contains information about the corresponding element in the one or more XML document that Synopsis Example 1 summarizes. Although not explicitly shown, each value in each node corresponds to one of the attributes disclosed previously.

With some of this information about one or more stored XML documents, the estimated I/O cost of a streaming evaluation against the one or more XML documents may be more accurately determined.

Synopsis Storage

A synopsis may be stored and analyzed in various manners. For example, a synopsis may be stored and analyzed as a text document. As another example, a node tree, such as synopsis tree 100, may be generated from a text version of a synopsis to allow for relatively fast navigation of the synopsis.

As another example, a hash table may be generated from a text version of a synopsis where each element in the hash table is hashed by a particular value of the element, such as a path identifier of the element. With respect to Synopsis Example 1, the path identifier of element 'body' is /bib/article/body. If an optimizer identifies that path identifier, then the path identifier is passed as a parameter in a hash function. The result of the hash function is a location in the hash table where synopsis information about element 'body' (under path /bib/article/body) is stored.

Whether stored as text, a node tree, and/or a hash table, a synopsis may be stored in volatile memory and/or non-volatile memory.

Estimating a Cost of Processing a Database Statement

Figure 2A:
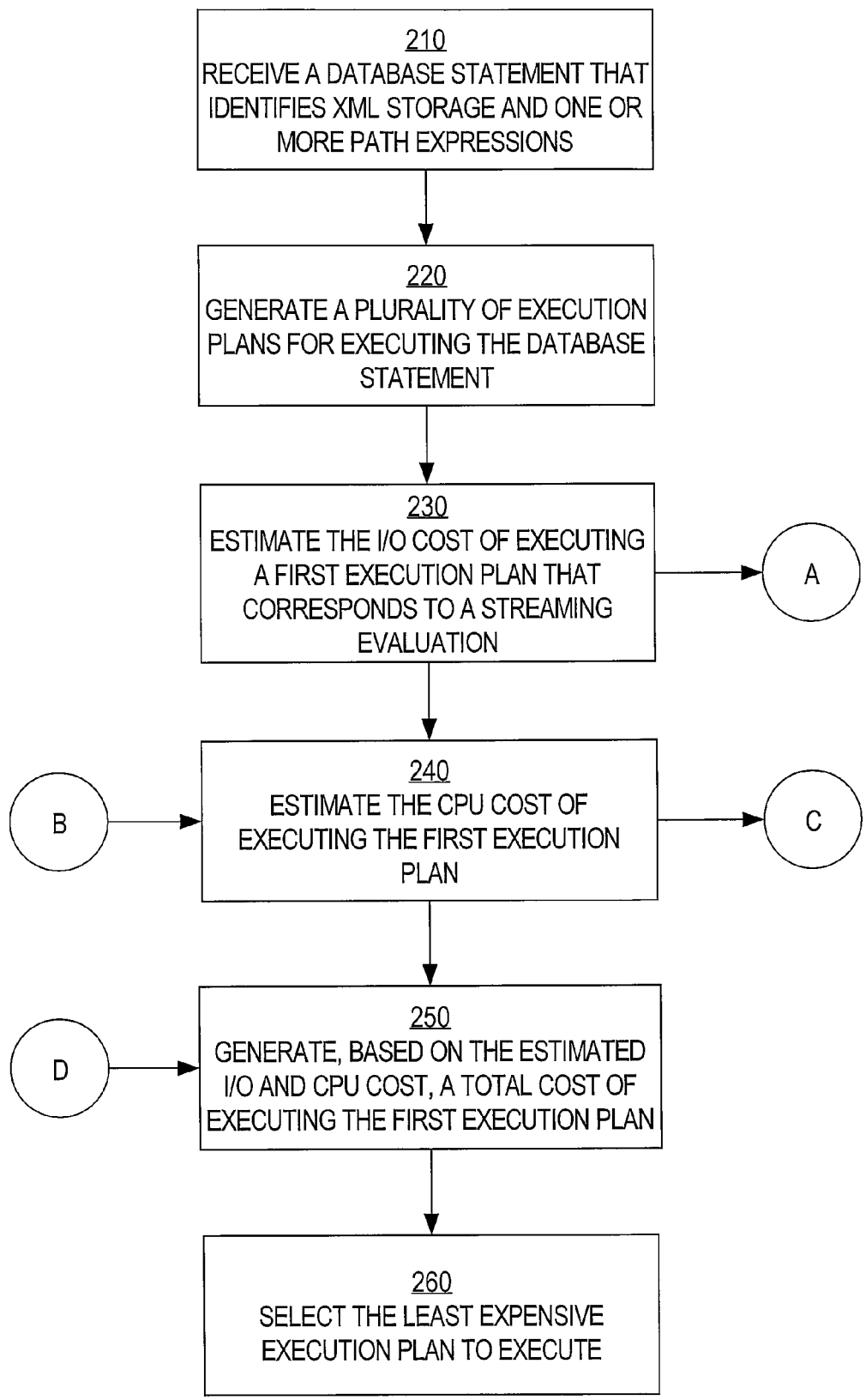
FIG. 2A is a flow diagram that depicts for estimating a cost of processing a database statement, according to an embodiment of the invention.

FIG. 2A is a flow diagram that depicts a process for estimating a cost of processing a database statement, according to an embodiment of the invention.

At step 210, a database statement is received. The database statement may be a query or a DML (data manipulation language) statement, such as a INSERT or UPDATE statement. The database statement may be a user-submitted database statement or a database statement that has been rewritten, e.g., with different operators, from an original database statement. The database statement identifies one or more path expressions and XML storage where the target data is stored. Query Example 1 is an example of such a database statement.

Query Example 1 references bibliography table 'bib' and path expressions '/bib/book', '/book/author', and '/bib/title'.

At step 220, a plurality of candidate execution plans is generated for executing the database statement. A first execution plan corresponds to one or more streaming operators that may be evaluated against the one or more path expressions. Embodiments of the invention are not limited to any particular implementation of the streaming operators. In Query Example 1, both Extract and XMLTABLE are operators that may be evaluated in a streaming fashion.

A second execution plan corresponds to a non-streaming evaluation (e.g., index-based evaluation) of the one or more path expressions. To illustrate a difference between the first and second candidate execution plans, the second candidate execution plan may indicate that the XMLTABLE operator uses an XML index to retrieve 'author' and 'title' elements from table 'bib'. In that case, the functions that are used to estimate I/O cost and CPU cost are likely to be entirely different than the functions that are used to estimate I/O cost and CPU cost of the streaming operator.

Estimating I/O Cost of Executing a Streaming Operator

Figure 2B:
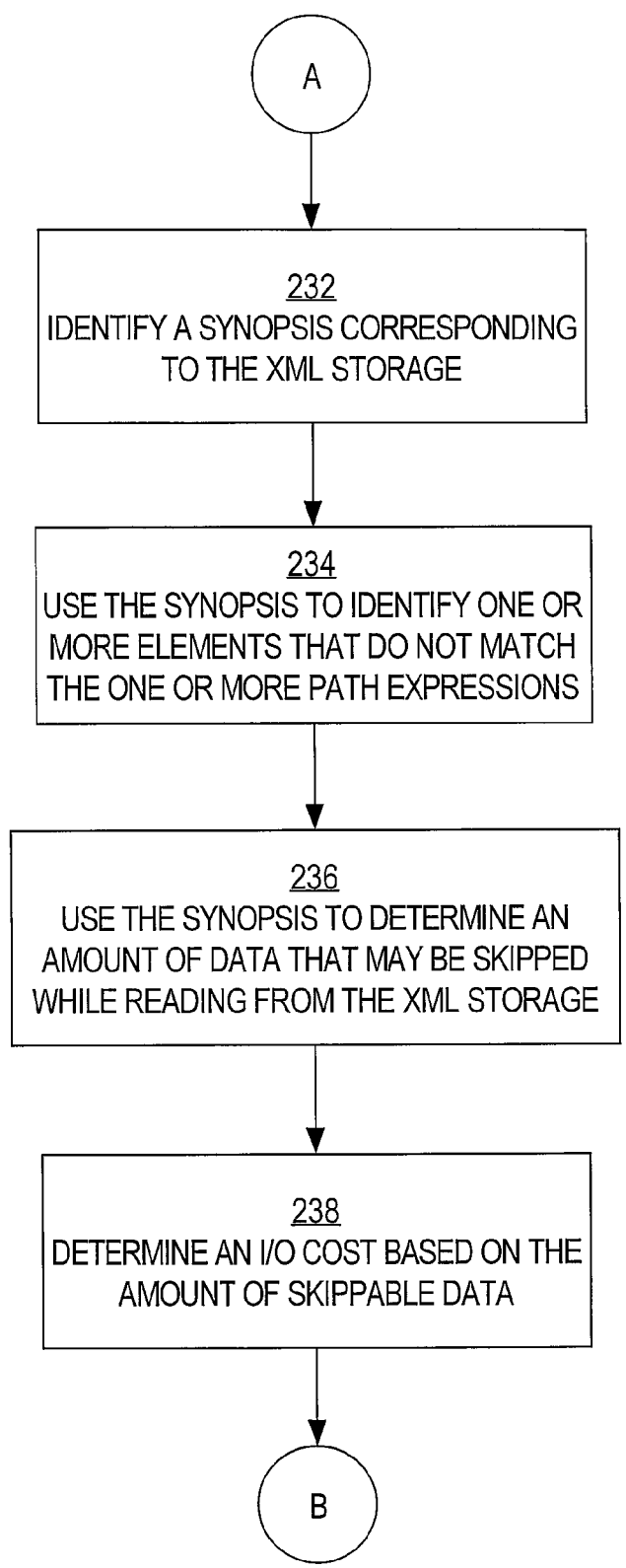
FIG. 2B is a flow diagram that depicts a process for estimating an I/O cost of reading data from XML storage according to a streaming operator, according to an embodiment of the invention.

At step 230, the I/O cost of executing the first execution plan is estimated. Step 230 comprises steps 232-238 of FIG. 2B, which is a flow diagram that depicts a process for estimating an I/O cost of reading data, according to a streaming operator (e.g., XMLTABLE), from XML storage, according to an embodiment of the invention. In Query Example 1, there may not be an I/O cost of evaluating the Extract operator in a streaming fashion because table 'S' may be generated and stored in local volatile memory. Thus, there would be no I/O for reading table 'S'.

At step 232, in order to estimate the I/O cost of a streaming operator, a synopsis corresponding to the target data is identified. In this example, in response to identifying that the database table references table 'bib', Synopsis Example 1 is identified as corresponding to table 'bib'. This identification may be performed by checking the table definition of table 'bib', which definition may contain data that identifies Synopsis Example 1.

At step 234, one or more elements are identified using the synopsis. These one or more elements do not match any of the one or more path expressions identified in the database statement. Such elements are referred to herein as "skippable elements" or "skippable subtrees." For convenience, Query Example 1 is repeated again below:

```
SELECT Extract(S.Author, '/author/name')
FROM bibliography bib,
    XMLTABLE('/bib/book' passing bib.object_value
    COLUMNS Author XMLTYPE PATH '/book/author',
        Title VARCHAR2(40) PATH '/book/title') S
WHERE S.Title = "Lord of the Rings";
```

Query Example 1

As stated previously, an implementation of the XMLTABLE operator constructs two NFAs: one for the driving path expression '/bib/book' and another for the two "column" path expressions '/book/author' and '/book/title'. The results of the XMLTABLE operator are stored in table 'S' that comprises two columns: an Author column of XMLtype and a Title column of type variable character. Each row in table 'S' corresponds to a different '/bib/book' element discovered in table 'bib'.

To continue with an example of step 234, by traversing Synopsis Example 1, it is determined that the element 'article' under the path '/bib/article' does not match any of the path expressions in Query Example 1. Therefore, the 'article' element is identified as a shippable element. Once a skippable element is identified, any elements in the subtree rooted at the skippable element do not need to be examined. For example, elements 'author', 'title', and 'body' under path '/bib/article' do not need to be examined, unless the 'article' is not associated with a skip_len value.

At step 236, the synopsis is used to determine an amount of data that may be skipped (e.g., by a search-based decoder) when reading data from the XML storage. According to an embodiment of the invention, the "skip_len" attribute in a synopsis is used to estimate the I/O cost of performing a streaming evaluation of an XPath expression.

In the present example, the element 'article' is identified as a skippable element. Thus, the skip_len value associated with the element 'article' is read. According to Synopsis Example 1, the skip_len value of the element 'article' is 200,000. Thus, the total skip length of 'article' elements is 200,000 bytes.

At step 238, an I/O cost of the evaluating the streaming operator against the one or more path expressions is determined based on the amount of skippable data. In the present example, the actual length of I/O is the length of the LOB that stores the pertinent XML data minus 200,000. In general, the I/O cost may be modeled as $c*(L-\text{sum}(S_i))$, where $S_i$ is the skip length of any unmatching or skippable element. In an embodiment, the skip length of any elements under a skippable element is not considered in the determination of sum $(S_i)$.

Generating a CPU Cost Function for a Streaming Operator

Figure 3:
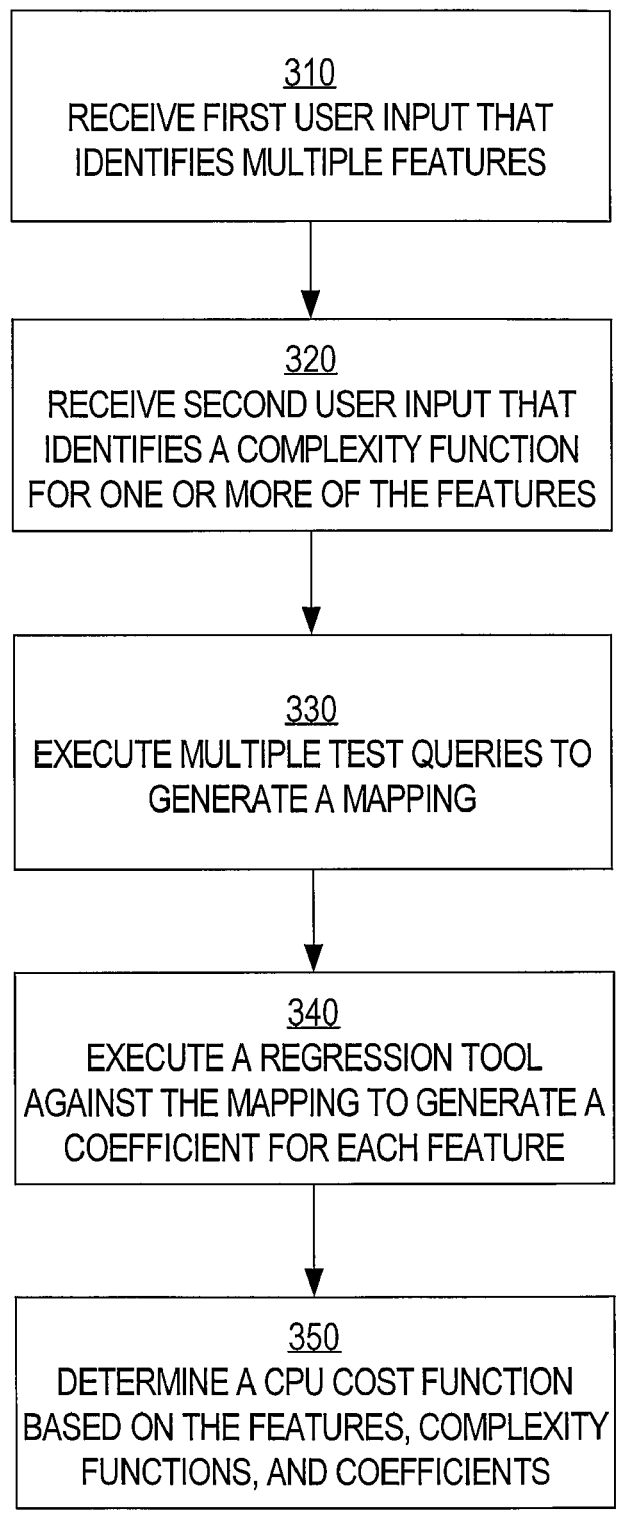
FIG. 3 is a flow diagram that depicts a process for generating a CPU cost estimate function for a streaming operator, according to an embodiment of the invention.

Another aspect of query cost is the CPU cost of executing one or more NFAs associated with a streaming evaluation of one or more path expressions. Thus, the process proceeds from step 238 of FIG. 2B to step 240 of FIG. 2A. At step 240, a CPU cost of executing the first candidate execution plan is estimated. In order to estimate the CPU cost, a CPU cost function for the streaming operator is first generated. One generation process, according to an embodiment of the invention, is depicted in FIG. 3.

At step 310, first user input is received that identifies a plurality of features, e.g., $f_1, f_2, \ldots, f_n$. A feature is an aspect of the implementation algorithm that influences the cost of executing the streaming operator. The CPU cost of executing a streaming operator is determined by many features (sometimes referred to as "factors"). Non-limiting examples of features include the number of input to an NFA that is generated for the operator, the number of input that actually triggers some state transitions in the NFA, and the number of output. Each of these features corresponds to some work of the NFA that requires CPU cycles.

The first user input may be the result of a user's analysis of a streaming operator's implementation algorithm. The user may be a developer that determined (or assisted in determining) the implementation algorithm.

At step 320, second user input is received that identifies a complexity function for each of one or more features of the plurality of features. A function (g) to estimate the CPU cost may be generically defined as: $\text{CPU\_cost}=g(f_1, f_2, \ldots, f_n)$. In some cases, function g is a linear function. In such cases, CPU_cost may be generically defined as $c_0+c_1*f_1+c_2*f_2+\ldots+c_n*f_n$, where $c_i$ are constant coefficients. In other cases, some features $f_i$ may not be linear with respect to CPU cost. Thus, in response to the second user input, the CPU cost function may be generically defined as: CPU_cost=$c_0+c_1*f_1*\log f_1+c_2*f_2^2+\ldots+c_n*f_n$. If any features are not identified in the second user input, then those features may simply be treated as being linear with respect to CPU cost.

At step 330, multiple test queries are executed to generate a mapping. The test queries may be actual queries that have been executed previously. For each test query, the mapping (e.g., a table) maps a total cost of executing the test query with a plurality of values. Each such value corresponds to a different feature of the plurality of features. Each value represents a cost associated with the corresponding feature. The value of each feature is a subcost, or a component of, the total cost. The following is an example of a mapping:

| TEST QUERY | TOTAL CPU COST | $f_1^2$ | $f_2$ | $f_3$ |
|---|---|---|---|---|
| Q1 | 10 | 2 | 4 | 1 |
| Q2 | 35 | 20 | 10 | 2 |
| Q3 | 44 | 21 | 15 | 4 |

Mapping Example 1

Mapping Example 1 shows three test queries, a total CPU cost for each test query, and costs for each feature $f_1$-$f_3$ of each query.

At step 340, a regression tool is executed against the mapping to generate a coefficient $c_i$ for each feature $f_i$. Thus, the mapping generated in step 330 is input to the regression tool. In an embodiment, the complexity function of each feature is also input to the regression tool. Without knowing (i.e., beforehand) the complexity function of each feature, the regression tool may be configured to automatically estimate the complexity function of each feature. Non-limiting examples of free regression tools that may be executed against the mapping include R and S+. Embodiments of the invention are not limited to any particular regression tool.

At step 350, a CPU cost function is determined based on the features, the complexity functions, and the coefficients. For example, the first user input in step 310 identifies three features: $f_1$, $f_2$, and $f_3$; the second user input in step 320 identifies a complexity function of $f_1$ as n*log n; and the regression tool used in step 340 generates coefficients $c_0=3.5$, $c_1=2.3$, $c_2=1.09$, and $c_3=4$. Thus, a specific CPU cost function based on this data from steps 310, 320, and 340 may be the following: CPU_cost=$3.5+2.3*f_1*\log f_1+1.09*f_2+4*f_3$.

The value of each feature $f_i$, e.g., number of output, in the resulting CPU cost function is a postpori value. In other words, the value of each feature is not known before the query is executed. Therefore, the value of each feature is estimated using statistics (such as a synopsis described previously) that were gathered on the XML data against which the database statement is executed. These values are then input to the CPU cost function, which generates an estimated CPU cost of the corresponding streaming operator.

In an embodiment, after a CPU cost function is generated for a streaming operator, the coefficients $c_i$ are tuned by "feeding" actual results into a mapping, such as Mapping Example 1, and executing a regression tool against the mapping. Therefore, the coefficients $c_i$ may become more accurate over time, which will cause the CPU cost function to similarly become more accurate.

Another aspect of CPU costing is what a CPU cost function should model. A CPU cost function may model, for example, the wall-clock time (elapsed time), the CPU cycles, or instruction count. In an embodiment, the instruction count is used because the wall-clock time and CPU cycles are specific to particular machines.

Estimating CPU Cost of Executing a Streaming Operator

Figure 2C:
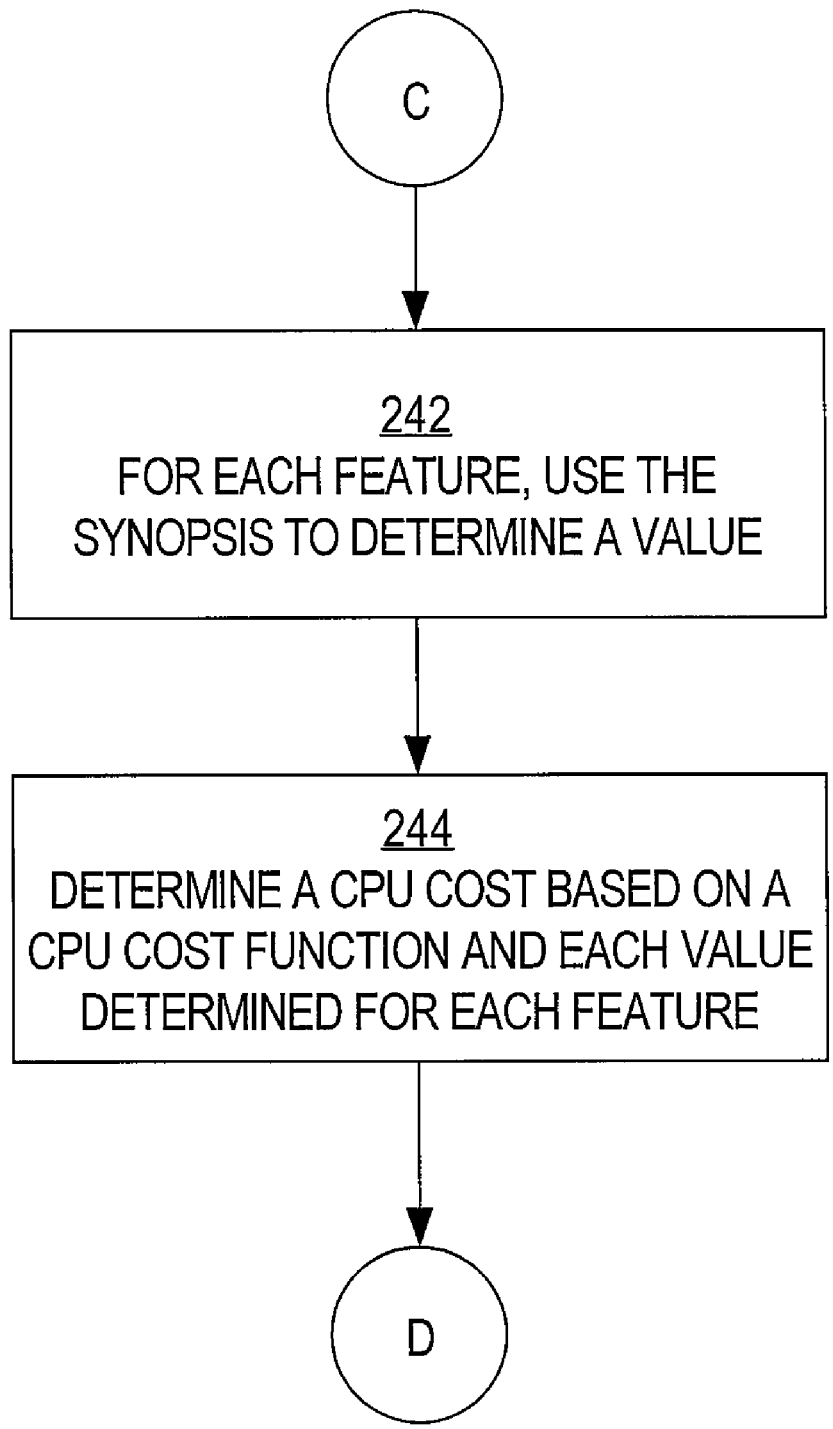
FIG. 2C is a flow diagram that depicts a process for estimating a CPU cost of executing a streaming operator, according to an embodiment of the invention.

Step 240 of FIG. 2A comprises steps 242-244 of FIG. 2C, which is a flow diagram that depicts a process for estimating a CPU cost of executing a streaming operator, according to an embodiment of the invention.

At step 242, the synopsis identified in step 232 is used to determine a value for each feature $f_i$. For example, $f_1$ corresponds to an estimated number of elements to be inserted into a work area (WA) buffer, $f_2$ corresponds to an estimated number of elements to be inserted into an element stack, and $f_3$ corresponds to an estimated number of elements to be inserted into an output buffer. An estimated number to be inserted into the WA buffer corresponding to a path expression depends on the number, in the corresponding XML document, of each element that corresponds to a non-accepting state in the NFA that corresponds to a path expression. Thus, in executing Query Example 1, an estimated number of elements to be inserted into the WA buffer for path expression '/bib/book' is the number of 'bib' elements, but not the number of 'book' elements. According to Synopsis Example 1, an estimated number of 'bib' elements to be inserted into the WA buffer for path expression '/bib/book' is 1.

An estimated number of elements to be inserted into the element stack corresponding to a path expression depends on the number, in the corresponding XML document, of each element that corresponds to all states in the NFA that corresponds to the path expression. Thus, in executing Query Example 1, an estimated number of elements to be inserted into the element stack for path expression '/bib/book' is the sum of the number of 'bib' elements and the number of 'book' elements, which is 1+200=201 according to Synopsis Example 1.

An estimated number of elements to be inserted into the output buffer corresponding to a path expression depends on the number, in the corresponding XML document, of each element that corresponds to all accepting states in the NFA that corresponds to the path expression. Thus, in executing Query Example 1, an estimated number of elements to be inserted into the output buffer for path expression '/bib/book' is the number of 'book' elements, which is 200 according to Synopsis Example 1.

At step 244, each determined value from step 242 is input to the CPU cost function that was generated by the process depicted in FIG. 3. The result of executing the CPU cost function yields an estimated CPU cost of executing the streaming operator. For example, given the example CPU cost function and the values for each feature $f_i$ discussed previously, an estimated CPU cost of executing the path expression '/bib/book' may be the following: may be the following: CPU_cost=$3.5+2.3*(1)*\log(1)+1.09*(201)+4*(200)=3.5+0+219.09+800=1022.09$.

Estimating a Cost of Processing a Database Statement (Cont.)

The process then proceeds from step 244 of FIG. 2C to step 250 of FIG. 2A. At step 250, an estimated total cost of executing the first candidate execution plan is generated based on the estimated I/O cost and the estimated CPU cost. Other costs may be considered in generating the estimated total cost. For example, there may be multiple streaming operators in a database statement for which I/O cost and/or CPU cost should be estimated.

At step 260, after estimated costs are generated for each candidate execution plan, the least "expensive" candidate execution plan is selected and executed.

Hardware Overview

Figure 4:
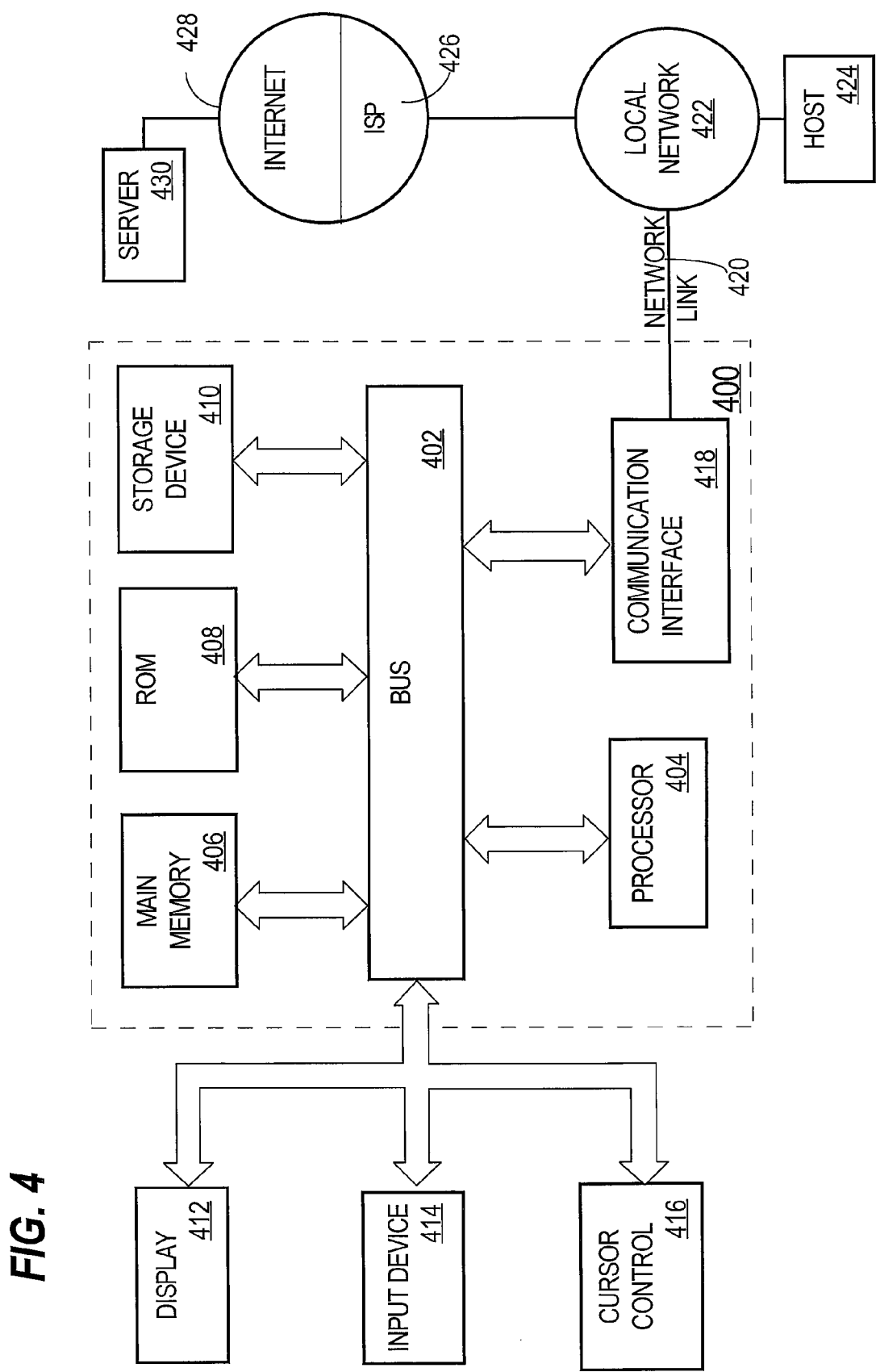
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining a cost of evaluating a query, the method comprising:
    analyzing one or more XML documents to generate statistics about a plurality of elements in the one or more XML documents;
    storing, in persistent storage, XML data that represents the one or more XML documents;
    wherein the statistics are separate from the XML data;
    wherein the statistics include skip length information that indicates, for each element in a subset of the plurality of elements, an amount of data in the persistent storage that said each element requires for storage, wherein said each element represents a subtree in one or more of the one or more XML documents and the amount of data indicates a size of the subtree;
    after storing the XML data in the persistent storage and generating the statistics, receiving a particular query that is to be evaluated against the XML data that is stored in the persistent storage; and
    in response to receiving the particular query and before evaluating the particular query against the XML data, analyzing at least a portion of the skip length information to estimate a I/O cost of reading at least a portion of the XML data;
    wherein the method is performed by one or more computing devices.

2. The method of claim 1, further comprising:
    in response to receiving the particular query, generating a plurality of execution plans based on the particular query,
    estimating, for each execution plan of the plurality of execution plans, a cost of evaluating said each execution plan,
    wherein each execution plan of the plurality of execution plans is configured to cause, when executed, results of the particular query to be returned.

3. The method of claim 2, further comprising:
    selecting a particular execution plan, of the plurality of execution plans, that is associated with an estimated cost that is lower relative to the estimated costs associated with the other execution plans of the plurality of execution plans; and
    executing the particular execution plan.

4. The method of claim 1, wherein a cost of evaluating the particular query includes an amount of resources that are required to process the particular query.

5. The method of claim 1, wherein:
    the statistics include hierarchical information that indicates a hierarchical relationship among the plurality of elements in the one or more XML documents.

6. The method of claim 5, wherein:
    the particular query includes a path expression, and
    estimating the I/O cost of reading the portion of the XML data includes:
        using the hierarchical information included in the statistics to identify an element, of the plurality of elements, that does not match any portion of the path expression; and
        using the skip length information included in the statistics to determine the amount of data, of the XML data, that is not required to be read from persistent storage.

7. The method of claim 1, wherein:
    the cost of evaluating the particular query is further based on a CPU cost of evaluating the particular query using a streaming operator;
    the method further comprising:
        receiving first data that identifies a plurality of features, each of which corresponds to an aspect of the algorithm of the streaming operator that influences the CPU cost of executing the streaming operator;
        receiving second data that identifies a complexity function for each feature of the plurality of features;
        evaluating a plurality of test queries using the streaming operator to generate a set of results;
        executing a regression tool against the set of results to generate a coefficient for each feature of the plurality of features;
        determining a CPU cost function for the streaming operator based on the plurality of features, the complexity function for each feature of the plurality of features, and the coefficient for each feature of the plurality of features;
    the CPU cost of evaluating the particular query using the streaming operator is based on the CPU cost function.

8. A method comprising:
    storing, in persistent storage, binary-encoded XML data that represents one or more XML documents;
    storing statistics about a plurality of elements in the one or more XML documents and encoded in the binary-encoded XML data;
    wherein the statistics are separate from the binary-encoded XML data;
    wherein the statistics include skip length information that indicates, for each element in a subset of the plurality of elements, an amount of data in the persistent storage that said each element requires for storage;
    after storing the binary-encoded XML data in the persistent storage and generating the statistics, receiving an XML query;
    in response to receiving the XML query, generating, based on an XML query, a plurality of execution plans,
    wherein a first execution plan, of the plurality of execution plans, is associated with a streaming evaluation of the XML query, wherein the streaming evaluation would require reading binary-encoded XML data from persistent storage,
    wherein a second execution plan, of the plurality of execution plans, is associated with an index-based evaluation of the XML query, wherein the index-based evaluation would require traversing an XML index to access portions of the binary-encoded XML data;
    estimating a first cost of executing the first execution plan, wherein estimating the first cost includes analyzing at least a portion of the skip length information to determine an amount of data, of the binary-encoded XML, that is not required to be read to evaluate the XML query;
estimating a second cost of executing the second execution plan; and
selecting, based, at least in part, on the first cost and the second cost, a particular execution plan, of the plurality of execution plans, to process the XML query;
wherein the method is performed by one or more computing devices.

9. The method of claim 8, wherein:
the statistics include hierarchical information that indicates a hierarchical relationship among a plurality of elements in the binary-encoded XML data.

10. The method of claim 9, wherein:
the XML query includes a path expression, and
estimating the first cost of evaluating the XML query includes:
using the hierarchical information included in the statistics to identify an element, of the plurality of elements, that does not match any portion of the path expression; and
using the skip length information included in the statistics to determine the amount of data, of the binary-encoded XML data, that is not required to be read from the persistent storage.

11. One or more machine-readable storage medium storing instructions which, when executed by one or more processors, cause:
analyzing one or more XML documents to generate statistics about a plurality of elements in the one or more XML documents;
storing, in persistent storage, XML data that represents the one or more XML documents;
wherein the statistics are separate from the XML data;
wherein the statistics include skip length information that indicates, for each element in a subset of the plurality of elements, an amount of data in the persistent storage that said each element requires for storage, wherein said each element represents a subtree in one or more of the one or more XML documents and the amount of data indicates a size of the subtree;
after storing the XML data in the persistent storage and generating the statistics, receiving a particular query that is to be evaluated against the XML data that is stored in the persistent storage; and
in response to receiving the particular query and before evaluating the particular query against the XML data, analyzing at least a portion of the skip length information to estimate an I/O cost of reading at least a portion of the XML data.

12. The one or more machine-readable storage media of claim 11, wherein the instructions, when executed by the one or more processors, further cause:
in response to receiving the particular query, generating a plurality of execution plans based on the particular query,
estimating, for each execution plan of the plurality of execution plans, a cost of evaluating said each execution plan,
wherein each execution plan of the plurality of execution plans is configured to cause, when executed, results of the particular query to be returned.

13. The one or more machine-readable storage media of claim 12, wherein the instructions, when executed by the one or more processors, further cause:
selecting a particular execution plan, of the plurality of execution plans, that is associated with an estimated cost that is lower relative to the estimated costs associated with the other execution plans of the plurality of execution plans; and
executing the particular execution plan.

14. The one or more machine-readable storage media of claim 11, wherein a cost of evaluating the particular query includes an amount of resources that are required to process the particular query.

15. The one or more machine-readable storage media of claim 11, wherein:
the statistics include hierarchical information that indicates a hierarchical relationship among the plurality of elements in the one or more XML documents.

16. The one or more machine-readable storage media of claim 15, wherein:
the particular query includes a path expression, and
estimating the I/O cost of reading the portion of the XML data includes:
using the hierarchical information included in the statistics to identify an element, of the plurality of elements, that does not match any portion of the path expression; and
using the skip length information included in the statistics to determine the amount of data, of the XML data, that is not required to be read from persistent storage.

17. The one or more machine-readable storage media of claim 11, wherein:
the cost of evaluating the particular query is further based on a CPU cost of evaluating the particular query using a streaming operator;
the instructions, when executed by the one or more processors, further cause:
receiving first data that identifies a plurality of features, each of which corresponds to an aspect of the algorithm of the streaming operator that influences the CPU cost of executing the streaming operator;
receiving second data that identifies a complexity function for each feature of the plurality of features;
evaluating a plurality of test queries using the streaming operator to generate a set of results;
executing a regression tool against the set of results to generate a coefficient for each feature of the plurality of features;
determining a CPU cost function for the streaming operator based on the plurality of features, the complexity function for each feature of the plurality of features, and the coefficient for each feature of the plurality of features;
the CPU cost of evaluating the particular query using the streaming operator is based on the CPU cost function.

18. One or more machine-readable storage media storing instructions which, when executed by one or more processors, cause:
storing, in persistent storage, binary-encoded XML data that represents one or more XML documents;
storing statistics about a plurality of elements in the one or more XML documents and encoded in the binary-encoded XML data;
wherein the statistics are separate from the binary-encoded XML data;
wherein the statistics include skip length information that indicates, for each element in a subset of the plurality of elements, an amount of data in the persistent storage that said each element requires for storage;

after storing the binary-encoded XML data in the persistent storage and generating the statistics, receiving an XML query;

in response to receiving the XML query, generating, based on an XML query, a plurality of execution plans, wherein a first execution plan, of the plurality of execution plans, is associated with a streaming evaluation of the XML query, wherein the streaming evaluation would require reading binary-encoded XML data from persistent storage, wherein a second execution plan, of the plurality of execution plans, is associated with an index-based evaluation of the XML query, wherein the index-based evaluation would require traversing an XML index to access portions of the binary-encoded XML data;

estimating a first cost of executing the first execution plan, wherein estimating the first cost includes analyzing at least a portion of the skip length information to determine an amount of data, of the binary-encoded XML, that is not required to be read to evaluate the XML query;

estimating a second cost of executing the second execution plan; and selecting, based, at least in part, on the first cost and the second cost, a particular execution plan, of the plurality of execution plans, to process the XML query.

19. The one or more machine-readable storage media of claim 18, wherein:

the statistics include hierarchical information that indicates a hierarchical relationship among the plurality of elements in the binary-encoded XML data.

20. The one or more machine-readable storage media of claim 19, wherein:

the XML query includes a path expression, and estimating the first cost of executing the first execution plan includes:

using the hierarchical information included in the statistics to identify an element, of the plurality of elements, that does not match any portion of the path expression; and using the skip length information included in the statistics to determine the amount of data, of the binary-encoded XML data, that is not required to be read from the persistent storage.

* * * * *

UNITED STATES PATENT AND TRADEMARK OFFICE
CERTIFICATE OF CORRECTION

| | | |
|---|---|---|
| PATENT NO. | : 8,024,325 B2 | Page 1 of 1 |
| APPLICATION NO. | : 12/145659 | |
| DATED | : September 20, 2011 | |
| INVENTOR(S) | : Zhang et al. | |

It is certified that error appears in the above-identified patent and that said Letters Patent is hereby corrected as shown below:

On page 2, in column 1, under "Other Publications", line 4, delete "Jornal," and insert -- Journal, --, therefor.

In column 12, line 8, delete "shippable" and insert -- skippable --, therefor.

In column 19, line 18, in Claim 10, delete "evaluating the XML query" and insert -- executing the first execution plan --, therefor.

Signed and Sealed this
Twenty-ninth Day of November, 2011

David J. Kappos
*Director of the United States Patent and Trademark Office*